Feb. 25, 1958
D. W. NORWOOD
2,824,696
DIRECT-READING PHOTOGRAPHIC EXPOSURE METERS
AND CALCULATOR DEVICES THEREFOR
Filed Sept. 10, 1956
2 Sheets-Sheet 1
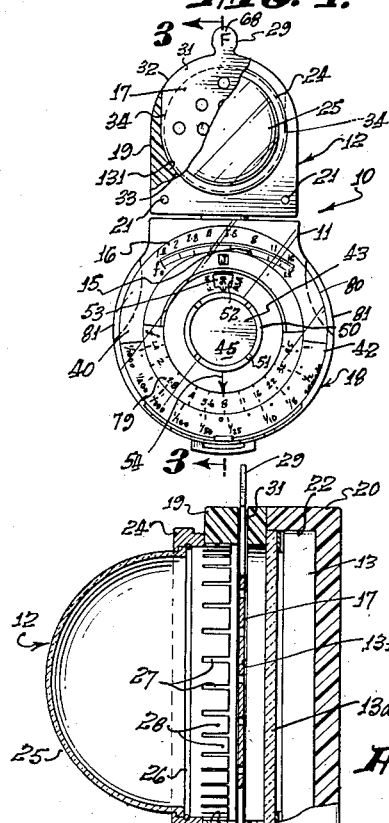
Donald W. Norwood,
INVENTOR.
BY William P. Green
ATTORNEY.

Feb. 25, 1958 D. W. NORWOOD 2,824,696
DIRECT-READING PHOTOGRAPHIC EXPOSURE METERS
AND CALCULATOR DEVICES THEREFOR
Filed Sept. 10, 1956 2 Sheets-Sheet 2
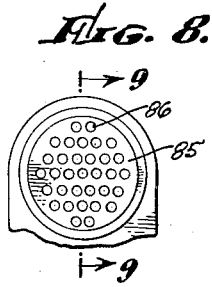
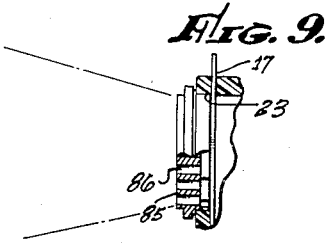
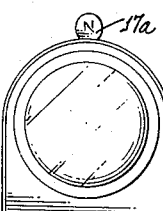
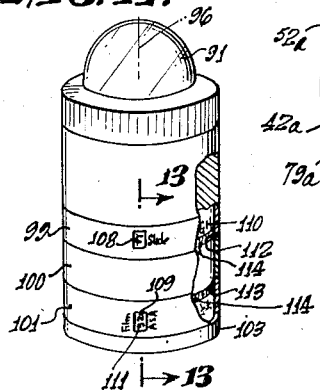
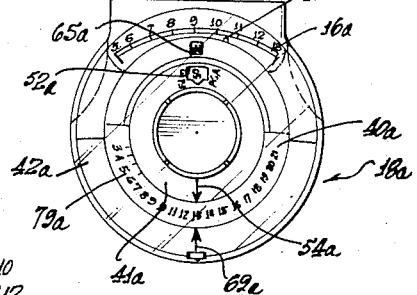
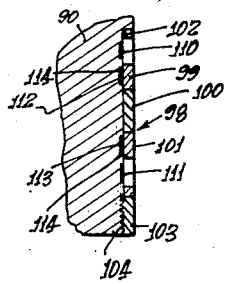
DONALD W. NORWOOD,
INVENTOR.
BY William P. Green
ATTORNEY.

United States Patent Office 2,824,696
Patented Feb. 25, 1958

2,824,696

DIRECT-READING PHOTOGRAPHIC EXPOSURE METERS AND CALCULATOR DEVICES THEREFOR

Donald W. Norwood, Pasadena, Calif., assignor to Donald H. Norwood, Pasadena, Calif., as trustee Application September 10, 1956, Serial No. 608,889

5 Claims. (Cl. 235—64.7)

This invention relates to photographic light meters, and particularly to improved calculating or factor-converting devices for use with such meters.

The invention is especially concerned with the "direct reading" or "simplified" type of meter, that is, a meter which reads directly in units which can be applied to a camera without calculation or conversion of any kind. In order to give such a direct reading, a meter may be preset to assume certain predetermined values or settings for all but one of the various light dependent camera conditions, so that the meter can then indicate directly the final setting. Thus, the meter may be preset for a desired film sensitivity and shutter time, to then indicate directly a proper lens aperture setting for the camera.

In a meter embodying the invention, the presetting of the device to any of several different direct reading conditions is effected by selective use of several different screens in the path of light to the light sensitive element of the meter. These screens have different light passing characteristics, so that the use of a particular screen automatically adjusts the meter to indicate directly the proper lens aperture setting, or similar setting, assuming predetermined values for the other variables.

A simplified meter of this type, while highly desirable in most respects, has the disadvantages of lacking the versatility of a conventional non-direct-reading type of meter, since the various presetting screens can only preset the meter to a few selected commonly used conditions, and cannot possibly cover all of the different situations which may on occasion be encountered. With this in mind, the general object of the present invention is to provide a calculator for use with such a screen type direct reading meter, and which will allow rapid calculation of the proper camera settings for any unusual circumstances for which the device is not direct reading. The meter thus has the advantage of being direct reading for all of the conditions which most frequently arise, say 90% of the time, and yet it is universally applicable, though of course not direct reading, to all other less common situations.

In order to allow for this versatility, I include in the calculator a movable part which is designed to be set or adjusted to any of different positions corresponding to the different presetting screens which may be used. This setting of the specified part of the calculator, in correspondence with a particular screen which is in use, adjusts the calculator to compensate for the light passing characteristics of that particular screen, and the calculator is in this way set to convert the reading of the meter to a proper value for any changed camera and film conditions which may be desired. More specifically, the part referred to may coact with two other relatively movable calculating parts, which may be set in accordance with the film sensitivity and the light meter reading respectively, with the converted camera setting or settings then being indicated by the relationship between markings or scales on these two of the three parts. Preferably, these two parts indicate a whole series of possible combinations of converted shutter time and lens aperture settings, any of which combinations may be used if desired. Also, the direct reading of the light meter, and the converted reading, may both be in LVS (light value scale) settings, rather than lens aperture settings, if desired.

In one form of the invention, the three relatively movable calculator parts consist of three discs mounted for rotation about a common axis. In that form, certain additional features of the invention have to do with a preferred manner of mounting these three discs, so that the lens aperture or LVS element is freely rotatable without any interference by the other parts. Specifically, the two other elements are detented in their different positions, and the detents are so designed as to avoid any tendency to spring press the parts into frictional engagement.

The above and other features and objects of the present invention will be better understood from the following detailed description of the typical embodiments illustrated in the accompanying drawings in which:

Fig. 1 is a front view of a first form of light meter constructed in accordance with the invention;

Fig. 2 is a side view of the Fig. 1 device;

Fig. 3 is an enlarged section taken on line 3—3 of Fig. 1;

Fig. 4 is a perspective view of one of the preadjustment slides or screens for the meter;

Fig. 5 is a fragmentary exploded view showing the various parts of the calculator device which is carried by the meter;

Figs. 6 and 7 are enlarged fragmentary perspective views of the two detenting elements used in the calculator;

Fig. 8 is a fragmentary front view showing a variational type of light collector for the meter;

Fig. 9 is a fragmentary section taken on line 9—9 of Fig. 8;

Fig. 10 is a front view of a variational form of the invention;

Fig. 11 is a perspective view, partially broken away, of a second variational form of meter embodying the invention;

Fig. 12 is a transverse section taken on line 12—12 of Fig. 11;

Fig. 13 is an enlarged fragmentary section taken on line 13—13 of Fig. 14, and

Fig. 14 is a view corresponding to Fig. 11, but showing the opposite side of the Fig. 11 device.

Referring first to Figs. 1 through 7, the meter 10 there shown includes a main body 11 carrying a relatively rotatable light pick-up head 12. Head 12 contains a conventional light sensitive photoelectric cell 13, which acts to develop a light induced voltage, and feed that voltage to a meter or indicator unit 14. This meter unit 14 includes a movable pointer 15 which is electrically actuated to positions indicating different lens aperture settings on an associated scale 16.

The head 12 is adapted to removably receive any of several different preadjustment slides or screens 17, for varying the amount of light which is transmitted to the light sensitive photoelectric cell 13. Each of these preadjustment slides 17 presets the device for a particular film sensitivity and shutter speed, so that the pointer 15 then indicates directly on scale 16 the correct $f$-stop setting to be used under existing light conditions if the specified film sensitivity and shutter time are also used. If, however, it is desired to use a different film sensitivity and/or shutter time than those for which the particular preadjustment slide 17 is designed, then the reading of pointer 15 can be converted to a proper value for any desired film sensitivity and shutter time conditions, by means of a special factor converter or calculator device 18 which is mounted on the front of body 11 of the meter.

The head 12 of the Fig. 1 device may be formed of two rigid sections 19 and 20, typically formed of a suitable rigid opaque resinous plastic material, and suitably secured together, as by screws 21. The light sensitive photoelectric cell 13 may take the form of a circular disc, which is mounted within a correspondingly shaped recess 22 formed in part 20 of the head, with a transparent glass disc 13a typically being disposed across the forward face of element 13. Light passes to cell 13 through a cylindrical passage 23 in part 19, into the forward side of which there is removably connected a ring 24 carrying a translucent hemispherical light collector dome 25, the dome typically being retained within ring 24 by a suitable resilient locking ring 26. The inner portion of ring 24 may contain a series of circularly spaced slits 27, to form between those slits a series of resilient spring fingers 28 which act to frictionally grip the wall of passage 23 to releasably hold the light collector unit in its illustrated Fig. 3 position of attachment to part 19. The illustrated type of light collecting dome 25 has been described more specifically and claimed in my Patent No. 2,214,283. This type of collector element is especially useful for incident light measurements, as distinguished from reflected light measurements. As will be understood, the light from translucent dome 25 passes inwardly through glass 13a to energize photoelectric cell 13 in accordance with the extent to which dome 25 is illuminated.

Fig. 4 shows the appearance of one of the preadjustment slides or screens 17, as it appears when removed from head 12. This slide consists of a thin and opaque sheet of metal having the illustrated configuration, and with an upper tab 29 provided for inserting and removing the slide. Each slide contains a different number of openings (or different sized openings), to pass only a predetermined portion of the collected light to photoelectric cell 13. As a result, each slide 17 acts to preset the meter to be direct reading for a particular combination of shutter time and film sensitivity (or equivalent combinations of these factors). For instance, the screen shown in Fig. 4 may be designed to preadjust the meter for direct reading when the shutter time is 1/50 of a second, and the film sensitivity is ASA 32. These predetermined characteristics may be printed on slide 17, as shown. Also, the various slides 17 are designated by different letters A, B, C, etc. printed on their upper tab portions 29, to allow for quick identification of the different slides.

The slides 17 are insertible downwardly into a transverse planar slit or recess 31 formed in the upper portion of part 19, which recess may be considered as having a lower continuation forming a groove 131 which extends radially outwardly into part 19 about the periphery of bore 23, to receive and confine the edges of the slide when it is in its active Fig. 3 position. The slide may have arcuate edges 32 and 33 across its upper and lower sides, with parallel flat edges 34 at its opposite sides; and the recess 31 and its continuation groove 131 which receive slide 17 may be correspondingly shaped to properly receive the edges of the slide. In order to retain slide 17 within recess 31, the slide may be formed of resilient metal or other material, and may normally be slightly bowed transversely of the direction of insertion into head 12, so that it must be deformed very slightly during such insertion.

Head 12 may be mounted to body 11 by a swivel connection 35, which allows rotary adjusting movement of head 12 relative to the body about axis 36. This swivel connection 35 is hollow, to pass therethrough the electric leads 37 from element 13 to the meter or indicator unit 14.

Body 11 may be formed of two sections 38 and 39 secured together in any suitable manner, as by a number of screws 140. Section 38 may be formed of a rigid opaque resinous plastic material, while section 39 is formed of a rigid transparent resinous plastic material such as methyl methacrylate or polystyrene. Between the two body sections 38 and 39, there may be clamped a metal ring 141, having a tab 142 containing an opening through which a carrying ribbon 143 is passed. The previously mentioned aperture setting scale 16 which coacts with pointer 15 extends arcuately along a forward side of body section 38, and may consist of a metal element embedded in the face of part 38 and carrying the desired f-stop markings (see Fig. 1). These f-stop markings are of course in the usual logarithmic arrangement. Pointer 15 and scale 16 can be easily viewed from the forward side of the meter, directly through transparent body section 39 and an overlying transparent portion of a later to be described calculator disc 40.

With particular reference now to Figs. 3 and 5, the calculator 18 includes three rotatably adjustable flat discs or elements 40, 41 and 42, which turn individually about an axis 43, and within an essentially circular recess 44 formed in the front of body section 39. These three discs 40, 41 and 42 are held in recess 44 by means of an annular center bearing or retaining element 45, which is stationarily attached to part 39 by a screw 46.

About element 45, there is rotatably mounted an annular part 47, which is held on part 45 by an annular outer flange 48 formed on the latter and engaging a shoulder 49 on part 47. Part 47 may be turned by engagement of a user's thumb or finger with an outwardly projecting portion 50 of part 47, which portion may have notches 51 to facilitate this turning action. At its axially inner end, part 47 rigidly carries disc 41, which may be a tight pressed fit on the inner reduced diameter portion of part 47. Thus, manual turning of part 47 acts to correspondingly rotatively adjust disc 41.

This disc 41 has an index window 52, which is labeled "Film—ASA," and through which the different numbers of an arcuate scale 53 carried by body part 39 may be selectively viewed. The numbers on scale 53 represent the different possible film sensitivities on the ASA scale, and may be formed on a suitable metal or other part embedded in the forward surface of body member 39. At a location diametrically opposite window 52, disc 41 carries a pointer 54 for coacting with a scale formed on the later to be described disc 40. Disc 41 is releasably retained within any of its different film sensitivity settings by means of a ball detent 55 contained within an opening 56 in part 39, and spring pressed forwardly by a spring finger 57 attached to part 39 by screw 58. Ball detent 55 is partially receivable within different notches 59 formed in the periphery of disc 41, to effect the desired detenting action, while at the same time permitting disc 41 to be turned if sufficient force is exerted to deflect ball 55 for reception in the next successive notch 59. The axially outward movement of ball detent 55, under the influence of spring 57, is limited by engagement of the ball with a curved shoulder 60 formed on part 39. As will be understood, the curvature of the surface of ball 55 causes the ball to be cammed away from shoulder 60 when one of the projections 61 between notches 59 of part 41 exerts lateral force against the ball as a results of the exertion of rotary turning force against part 47. The notches 59 in element 41 are spaced circularly distances corresponding to the spacing between successive film sensitivity markings on the coacting scale 53, to detent the element 41 in the various positions in which the different film sensitivity markings are visible through window 52.

About the periphery of disc 41, the transparent body part 39 has a short axially projecting annular flange 62, outwardly of which there is received the disc 42. As seen best in Fig. 5, this disc has an upper portion 63 of reduced radial extent, and a lower portion 64 of greater radial extent. The upper portion 63 contains an index window 65 through which there are selectively visible any of a series of letters 66 formed on an arcuate scale member 67 which is stationarily mounted to the forward face of part 39. These letters A, B, C, etc. on scale 67 correspond respectively to the various letters 68 formed on tabs 29 of the different slides 17. Also, the word "slide" may be printed on the forward face of part 63 adjacent window 65. The lower widened portion 64 of part 42 carries an arcuate scale 69 having a series of shutter times (1 second, ½ second, ⅕ second, etc.) positioned along the scale in a logarithmic arrangement. At a location diametrically opposite window 65, part 42 carries an axially outwardly extending actuating finger 71, which projects axially beyond part 40 and body element 39 to permit turning of disc 42 by a user. This finger or tab 71 projects radially outwardly a short distance beyond the arcuate peripheral edge 72 of the rest of portion 64 of part 42, and is received within an arcuate increased diameter recess 73 formed in the rim 74 of part 39 which defines the main calculator recess 44.

The rotary motion of disc 42 about axis 43 is limited by engagement of tab 71 with body shoulders 75 formed at the ends of recess 73. Disc 42 and its integral tab 71 are preferably formed of a resilient material, such as a stiff spring metal, so that tab 71 may function also as a detent element. For this purpose, tab 71 has a rounded lug 76, which is selectively receivable and is yieldingly urged into a series of spaced notches formed in the essentially arcuate wall of increased diameter recess 73. Detent 76 thus coacts with the various notches 77 to yieldingly hold part 42 in any of the various positions in which the different letters A, B, C, D, etc. are individually visible through window 65. The rounded configuration of lug 76 of course causes that lug and tab 71 to be deflected slightly radially inwardly as lug 76 moves from one notch 77 to the next. In order to increase the resilient deflectibility of tab 71, part 42 may contain a narrow arcuate slot 78 spaced a short distance inwardly from the periphery of part 42 adjacent and at opposite sides of the location of tab 71.

The third rotatable disc 40 is freely rotatable relative to the other two discs 41 and 42, and is positioned over those two discs. Element 40 is rigid and formed of a transparent resinous plastic material, such as methyl methacrylate or polystyrene, so that the various previously described scales 16, 53, 67, 69, and pointers 15 and 54 can all be viewed through disc 40. At its inner side, disc 40 carries an arcuate scale 79, which is located radially between and directly adjacent scale 69 and arrow 54. This scale element 79 has markings which are visible from the outside of part 40, and which represents the various $f$-stop settings (1.4, 2, 2.8, 4, etc.) in logarithmic arrangement. As seen clearly in Fig. 1, the scale element 79 has position indicating marks at each of these various settings which are received directly adjacent the end of arrow 54, and also are received directly adjacent the associated position indicating markings on scale 69, so that the $f$-stop scale coacts directly with the arrow 54 and shutter speed scale 69.

The peripheral edge of disc 40 is knurled or irregularized at 80, and is accessible to a user at the locations of two cut-a-way portions 81 of body part 39, so that part 40 may be turned by engagement with its outer knurled edge. In this connection, it is noted that the other two discs 41 and 42 are purposely so formed and so detented as to avoid the exertion of any force against disc 40 by the other two discs, to thus allow for the desired free rotatability of disc 40 without any frictional engagement tending to turn the other two discs. For this purpose, flange 62 of part 39 has an axial thickness slightly greater than the thickness of discs 41 and 42 (see Fig. 3) to hold disc 40 out of tight frictional engagement with parts 41 and 42. Also, detent tab 71 is designed to exert a radial yielding force, rather than an axial force, to avoid pressing the two discs 40 and 42 together. Further, flange 48 of part 45 prevents disc 41 from bearing axially against disc 40 under the influence of spring 57, and ball 55 is held by the engaged parts at a position such that it cannot bear against disc 40.

At the rear of body part 38, there may be provided a pocket for releasably holding an extra one of the slides 17. As seen in Fig. 3, this pocket may be provided by forming a shallow recess 82 of a size and shape to receive all but the tab portion 29 of one of the thin slides 17, with a sheet metal retaining plate 83 being attached by screws 84 to part 38, and overlapping a lower portion of recess 82 to hold slide 17 within that recess. To withdraw the slide, the upper end of the latter is slightly deformed to force it out of the recess past plate 83.

In using the device of Figs. 1 to 7, a user selects one of the slides 17 and inserts it into recess or slit 31 in the position of Fig. 3. For instance, a user might select the slide represented in Fig. 4, which is designated by the letter F, and is usable for 1/50 second shutter time and ASA 32 film sensitivity. Normally, the camera will then be set at 1/50 of a second shutter time, and film of an ASA 32 sensitivity will be employed. When these conditions are met, the pointer 15 will indicate directly on scale 16 the aperture setting to be used on the camera. As will be apparent, this direct reading is also applicable to other film sensitivity and shutter time combinations which require the same amount of light as ASA 32 and 1/50 of a second. For instance, the same directly read $f$-stop reading on scale 16 could be applied to a combination of 1/25 second shutter time and ASA 16 film sensitivity; or 1/100 second and ASA 64.

It is contemplated that a complete set of the slides 17 will consist of 19 slides in number, labelled alphabetically A through S. However, for most persons, a relatively few of the different slides 17 (for example about 4 slides) will allow for enough direct reading conditions of the meter to satisfy the large majority of the photographic conditions that he will encounter (say about 90% of the situations). For the other 10% of the situations, the calculator device 18 is utilized to convert the direct reading attained with one of the slides 17 to satisfy any desired altered set of conditions. This calculation or conversion is effected as follows:

(1) Disc 41 is manually set, by turning element 47, to a position in which the ASA sensitivity of the film to be used in the camera appears through window 52.

(2) Disc 42 is turned, by tab 71, to a position in which the letter which appears through window 65 is the same as the letter which appears on the tab 29 of the slide 17 which is in use. This adjusts the calculator to compensate for the use of the particular slide.

(3) The meter is held in proper position for taking an incident light reading, and the $f$-stop reading indicated by pointer 15 on scale 16 is noted. (For instance, the reading $f$–8 as seen in Fig. 1.)

(4) Disc 40 is then turned to a position in which arrow 54 on disc 41 points to the same $f$-stop indication on scale 79 as has been read from scale 16 and pointer 15.

(5) With the three discs thus positioned, the operator may choose any desired $f$-stop setting for the camera, and can find an appropriate shutter time setting by noting the shutter time on scale 69 which is directly opposite that chosen $f$-stop setting. For instance, in the setting of Fig. 1, if the operator desires to use a lens aperture of $f$–22, he should use the shutter setting of ⅕ of a second, since these two markings on scales 69 and 79 are directly opposite one another. Similarly, any other pair of aligned readings on scales 69 and 79 may be used together, so that the operator may very easily determine a proper setting for any lens aperture setting, or vice versa. This allows for complete flexibility of the meter, to determine proper settings for any possible set of circumstances, even though the meter is primarily of the direct reading type, and thus has the operational simplicity of such a direct reading meter under all but very unusual circumstances.

To indicate theoretically the principle upon which the calculator functions in converting the direct reading to satisfy conditions other than those which are built into the selected slide 17, it is noted that the various factors with which we are concerned have a relationship defined by the following equation (the derivation of this equation being discussed in greater detail in my copending application Serial No. 549,455, filed November 28, 1955.):

$$\frac{f_m^2}{t_m S_m} = \frac{f_c^2}{t_c S_c} \qquad (1)$$

where $f_m$ = f-stop number indicated by the meter.
$t_m$ = shutter time preset on the meter by slide 17.
$S_m$ = film index preset on the meter by slide 17.
$f_c$ = f-stop number to be used on camera lens.
$t_c$ = shutter time to be used on camera.
$S_c$ = sensitivity of film in camera.

By transposition—

$$S_c \times f_m^2 \frac{t_c}{t_m \times S_m} = f_c^2 \qquad (2)$$

Then—

$$\text{Log } S_c + 2 \log f_m + \log t_c - \log (t_m \times S_m) = 2 \log f_c \qquad (3)$$

The calculator 18, when utilized in the manner discussed above, functions to mechanically add and subtract these logarithms, with the various scales being in such relation as to produce the different possible choices for $t_c$ and $S_c$ as discussed.

The set of slides 17 should include one slide which has a 100% light transmission characteristic, that is, a slide in which the entire area opposite photoelectric cell 13 is unobstructed, typically labelled slide S. When this slide is in use, the meter is extremely sensitive to any light to which it may be subjected, and thus can be used when very little light is present. Though this slide may not give any reading on scale 16 which is directly usable in the camera, the disc 42 can be set to a position in which a letter corresponding to the letter on the slide in question appears through window 65, and the calculator may then be used in the manner described above to indicate the various possible combinations of lens aperture and shutter time settings which may be utilized with a particular film sensitivity as seen through window 52.

If it is desired to take reflected light readings, rather than incident light readings, the light collector unit 24—25 may be removed from the meter head 12, and a different type of collector unit 85 may be inserted into passage 23. This unit 85 may consist of an element having a number of parallel somewhat elongated light passing passages 86, which limit the light acceptance angle of the meter. The portion of element 85 which is received within passage 23 is a tight enough fit to frictionally hold unit 85 in position. When collector unit 85 is used, specially designed slides 17 are employed which have appropriate characteristics in relation to reflected light, film sensitivity, and shutter time, and which have their openings positioned directly opposite passages 86 of element 85. Of course, the position of pointer 15 is read in the same manner regardless of whether the light collecting unit 85 or the unit 24—25 is employed, and the calculations by device 18 are also made in the same way regardless of which pick-up unit is employed.

An additional structural feature of the device shown in Figs. 1–9 resides in the special design of the device in a manner preventing any deflection of the pointer 15 by electrostatic charges developed in the device. As has been previously mentioned, both the body section 39 and disc 40 are preferably formed of a transparent resinous plastic material. Normally, of course, the rotation of such a plastic disc relative to a plastic body would tend to develop localized electrostatic charges on these two parts, which charges might then deflect metal pointer 15 away from a true and accurate reading. In order to prevent such deflection, I form discs 41 and 42, which are received axially between parts 39 and 40, of an electrically conductive material, preferably a metal such as bronze, so that any charges on the metal discs 41 and 42 will be distributed very uniformly by reason of the conductivity of the discs, and consequently any electrostatic charges on the closely adjacent plastic material will also be distributed uniformly over the plastic, and will thus have no effect on pointer 15. To maximize this effect, pointer 15 is made as short as possible, and projects only a very short distance radially beyond disc 42.

Some cameras are now being made which are designed for a setting called a light value scale (LVS) setting, which automatically assures a proper shutter setting for a given lens aperture setting, or vice versa. Fig. 10 shows a variational form of device which is similar to that of Figs. 1 to 7 except that it gives LVS readings, rather than f-stop and shutter time readings. In this device, the scale 16a is marked off in LVS markings, and the pointer 15a indicates directly a proper LVS camera setting to be used under the condition for which slide 17a is designed. In this case, each slide 17a has a light transmission characteristic corresponding to a particular film sensitivity for which the slide presets the meter (slides 17a not being in any way related to shutter time). Thus, any of the various slides 17a can render the device direct reading in terms of LVS setting as long as the film sensitivity associated with the particular slide is used in the camera.

The calculator 18a of Fig. 10 is identical with that of Figs. 1 to 7 except that an LVS scale 79a is substituted for lens aperture scale 79 of Fig. 1, and a single arrow 69a is substituted for scale 69 on disc 42. In using the calculator of Fig. 10, discs 41a and 42a may first be set so that the sensitivity of the film in the camera appears through window 52a, and the letter designating the particular slide 17a which is in use appears through window 65a. Disc 40a is then turned to a position in which the LVS reading of pointer 15a is directly alined with arrow 54a of disc 41a, in which position the arrow 69a on disc 42a will then indicate directly the proper LVS setting for the camera if the film sensitivity appearing through window 52a is used. As in the case of the first form of the device, the markings on scale 79a extend to locations directly adjacent both edges of scale 79a, and thus directly adjacent arrows 54a and 69a to give proper readings.

Figs. 11 to 14 illustrate a final form of the invention which is essentially the same as that shown in Figs. 1 to 7 except that the unit takes an externally cylindrical configuration. In this last form of the invention, the cylindrical body 90 carries at its upper end a light collector dome 91 from which light passes to a photoelectric cell 92 contained within the hollow body. In passing to cell 92, the light passes through any of various selectively usable slides 93, fitting into a transverse recess or slit 193, and corresponding to the previously discussed slides 17 (except that tabs 293 of the slides are turned downwardly so that their identifying letters may be viewed from the side of the device). Cell 92 electrically actuates a meter or indicator unit 94, whose pointer 95 moves along a circular path centered about the axis 96 of the device, to directly indicate lens aperture settings on a scale 97 stationarily carried by the body. Body 90 may have a transparent wall through whihc scale 97 and pointer 95 are visible from the same side of the device as that from which tab 293 is visible.

The calculator portion 98 of the Fig. 11 device has three relatively movable elements 99, 100 and 101 which carry markings corresponding respectively to those on discs 41, 40, and 42 of Figs. 1 to 7. However, instead of being mounted for rotation in the same manner as in Fig. 3, these three elements 99 to 101 take the form of essentially cylindrical vertically successive rings which are rotatably mounted about a somewhat reduced diameter portion 102 of body 90 of the device, and which are retained on the body by a lower retaining ring 103, which is threaded onto the body 104. With particular reference to Fig. 11, ring 99 has at its forward side a downwardly pointing arrow 105, which is received directly adjacent the upper markings of a logarithmic scale 106 formed on ring 100 and representing the various lens aperture or f-stop settings. Ring 101 has a logarithmic scale 107, whose markings are received directly adjacent the lower markings of scale 106 on ring 100, with the scale on ring 101 representing the different shutter time settings in fractions of a second. Thus, the arrow 105 and the two scales 106 and 107 correspond respectively to the arrow 54 and the two scales 79 and 69 in Fig. 3.

At the opposite side of the Fig. 11 device (see Fig. 14) rings 99 and 101 have two index windows 108 and 109, through which two series of markings 110 and 111 formed on the surface of body 90 are visible. The markings 110, visible through window 108, are the letters A, B, C, etc., corresponding to the various different slides 93, while the markings 111, visible through window 109, consist of the various possible film sensitivities. The two rings 99 and 101 are releasably detented in any of their various positions, in which the different individual markings are visible through windows 108 or 109, and by any suitable detenting mechanism. As an example I have illustrated a detenting arrangement including a pair of rounded inner lugs 112 and 113 formed on the inner surfaces of rings 99 and 101 respectively, and each receivable selectively within any of different correspondingly shaped detent recesses 114 formed in body 90. The rings 99 and 101 may be formed of a somewhat resilient spring metal, so that the resilience of this metal acts to yieldingly urge lugs 112 and 113 into the various recesses 114. The third ring 100 is of course freely rotatable to any position, and is not detented in any position, in correspondence with the operation of the ring 40 in Fig. 3.

In using the calculator of the Figs. 11 to 14 device, parts 99 and 101 are first set so that the markings visible through windows 108 and 109 indicate respectively the slide which is in use, and the sensitivity of the film which is to be used. The ring 100 is then turned to a position in which arrow 105 points to an f-stop marking on ring 100 corresponding to the reading of the meter pointer 95 on scale 97. The relationship between the scales on rings 100 and 101 then indicates the various possible combinations of shutter time and lens aperture which may be used.

It is noted that in Figs. 11 to 14 the ring 99 which carries pointer 105 coacts with the lettered scale 110 referring to the different slides, and the ring 101 which carries the shutter time scale coacts with the film sensitivity scale, whereas in Fig. 1 this relationship is reversed, so that ring 41 carrying pointer 54 coacts with the film sensitivity scale, and the shutter time ring 42 coacts with slide scale 67. This reversal is made in order that all scales may read from left to right in both of these forms of the invention.

I claim:

1. A light meter comprising a body containing an indicator having a pointer electrically movable to different positions in accordance with the intensity of light to which the meter is subjected, said body having a front wall with a transparent portion through which the pointer is visible, a first rotatably adjustable calculator disc overlying and rotatable relative to said front wall of the body, said disc and said front wall of the body both being formed at least partially of a resinous plastic material, and a metal calculator disc rotatably adjustable relative to said body and said first disc about the same axis as the latter and positioned axially between said first disc and said body at a location essentially in front of said pointer to prevent the development of localized electrostatic charges on the body and first disc tending to deflect the pointer.

2. A calculator for use with a light meter comprising a body, three discs mounted to a side of said body for rotation about a common axis and bearing markings coacting to effect a desired calculation, a first of said discs being disposed across the axially outer side of a second of the discs, a resilient actuating finger projecting from a radially outer portion of said second disc and axially past said first disc to a location accessible for manual actuation at the axially outer side of the first disc, and a series of indentations formed on the body and engageable with said spring finger to releasably detent the second disc in different adjusted positions.

3. A calculator as recited in claim 2, in which said resilient finger bears radially outwardly against said body and into said indentations.

4. A calculator as recited in claim 2, in which the third disc is located radially inwardly of said second disc and axially inwardly of said first disc, there being a hub for actuating said third disc and projecting axially past the first disc to a manually accessible location, and a resilient detent for holding said third disc in any of different adjusted positions.

5. A calculator as recited in claim 4, including means presenting a shoulder which is fixed relative to the body and is engageable by said hub to limit axially outward movement of said hub and third disc and thereby prevent the third disc from frictionally interfering with free rotation of the first disc.

References Cited in the file of this patent

UNITED STATES PATENTS

| | | |
|---|---|---|
| 2,389,617 | Freund | Nov. 27, 1945 |
| 2,550,936 | Poirette | May 1, 1951 |
| 2,667,809 | Williams | Feb. 2, 1954 |
| 2,669,155 | Brow | Feb. 16, 1954 |

FOREIGN PATENTS

| | | |
|---|---|---|
| 968,759 | France | May 3, 1950 |